United States Patent
Baldas et al.

(10) Patent No.: US 6,308,873 B1
(45) Date of Patent: Oct. 30, 2001

(54) MOTOR VEHICLE STORAGE APPARATUS

(75) Inventors: Jason Paul Baldas, Warren; Gregory W. Alfano, White Lake; Eileen Marie Avram, Canton, all of MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 09/475,828

(22) Filed: Dec. 30, 1999

(51) Int. Cl.⁷ .................................................. B60R 7/00
(52) U.S. Cl. ................ 224/281; 217/8; 217/15; 224/404; 224/539
(58) Field of Search ................. 224/281, 404, 224/310, 314, 539; 517/8, 15, 47

(56) References Cited

U.S. PATENT DOCUMENTS

| | | | | |
|---|---|---|---|---|
| 612,680 | * | 10/1898 | Shellhouse | 217/47 |
| 674,537 | * | 5/1901 | Marlin et al. | 217/47 |
| 835,733 | * | 11/1906 | Penrod | 217/47 |
| 872,600 | * | 12/1907 | Wharton | 217/15 |
| 965,089 | * | 7/1910 | Dickie | 217/47 |
| 967,923 | * | 8/1910 | Hutton t al. | 217/15 |
| 1,015,430 | * | 1/1912 | Farmer | 217/15 |
| 1,072,826 | * | 9/1913 | Cooke | 217/15 |
| 1,115,759 | * | 11/1914 | Williamson | 217/15 |
| 1,135,598 | * | 4/1915 | McLain | 217/15 |
| 1,238,028 | * | 8/1917 | Lee | 217/47 |
| 1,471,508 | * | 10/1923 | Spangler | 217/15 |
| 1,524,966 | * | 2/1925 | Boelman et al. | 217/15 |
| 2,517,178 | * | 8/1950 | Cheatham, Jr. | 217/15 |
| 2,914,210 | * | 11/1959 | Paston | 217/15 |
| 4,305,695 | | 12/1981 | Zachrich . | |
| 4,540,213 | | 9/1985 | Herlitz et al. . | |
| 4,705,315 | | 11/1987 | Cherry . | |
| 4,718,584 | | 1/1988 | Schoeny . | |
| 4,875,730 | | 10/1989 | Justice . | |
| 4,917,430 | * | 4/1990 | Lawrence | 296/376 |
| 5,127,697 | | 7/1992 | St. Marie . | |
| 5,186,510 | | 2/1993 | Stapp . | |
| 5,340,183 | | 8/1994 | Horian . | |
| 5,372,396 | | 12/1994 | Van Nahmen . | |
| 5,526,972 | | 6/1996 | Frazier et al. . | |
| 5,535,931 | | 7/1996 | Barlow t al. . | |
| 5,570,921 | | 11/1996 | Brooker . | |
| 5,626,380 | | 5/1997 | Elson et al. . | |
| 5,715,978 | * | 2/1998 | Ackeret | 224/42.33 |
| 5,762,244 | * | 6/1998 | Wagner et al. | 224/281 |
| 5,961,171 | | 10/1999 | Iijima . | |
| 5,964,492 | * | 10/1999 | Lyon | 224/404 |
| 6,006,971 | * | 12/1999 | Coleman et al. | 224/404 |
| 6,099,232 | * | 8/2000 | Dixon et al. | 224/310 |

\* cited by examiner

Primary Examiner—Stephn P. Garbe
(74) Attorney, Agent, or Firm—MacMillan, Sobanski & Todd, LLC (57) ABSTRACT

A motor vehicle storage apparatus comprises a tray. Opposing doors are pivoted to the tray. The doors are displaceable between a raised position and a lowered position. Ends are pivoted to the tray. The ends are displaceable between a raised position and a lowered position. The doors and the ends cooperate to form peripheral walls for bounding a storage area when in the raised position.

8 Claims, 7 Drawing Sheets

MOTOR VEHICLE STORAGE APPARATUS

BACKGROUND OF THE INVENTION

1. Field of the Invention

This invention relates in general to motor vehicles and, more particularly, to a collapsible storage apparatus for motor vehicle cargo areas and trunk compartments which reduces the risk that cargo will shift, slide, or roll about the cargo area and trunk compartment during the operation of the motor vehicle.

2. Description of Related Art

Motor vehicles are provided with cargo areas and trunk compartments for transporting and storing cargo. Cargo areas and trunk compartments are generally defined by a load surface extending between the motor vehicle side panels and the rear seat and rear end of the motor vehicle. The cargo transported and stored on the load surface typically shifts, slides, or rolls about the load surface in response to the motion of the motor vehicle induced by accelerating, braking, and turning.

It is important to prevent cargo from shifting about the load surface in an effort to promote safety and to prevent cargo from spilling or from being damaged when being transported or stored.

Quite often, cargo which shifts about the load surface comes to rest deep within the cargo area or trunk compartment. As a consequence, the motor vehicle operator or passenger must bend over and stretch to recover the cargo from the cargo area or trunk compartment.

Of recent popularity are cargo nets. Such nets are usually formed from flexible elastic cords having hooks or other fasteners that cooperate with eyes strategically located in the motor vehicle cargo area or trunk compartment. Such nets are limited in their applications. They fail to provide a rigid structure for receiving fragile cargo. Fastening the net can require the motor vehicle operator or passenger to bend and stretch into the cargo area or trunk compartment. Moreover, deployment of the net may require tension over the cargo that can crush and damage fragile cargo.

Various organizing arrangements have been proposed for use in motor vehicle cargo areas and trunk compartments. Such arrangements include partitions or racks that divide the cargo area or trunk compartment into a plurality of discrete storage areas. Some arrangements include partitions that are collapsible and removable to allow the arrangement to be folded and stored in a compact form. These arrangements may be expensive to manufacture, especially in the secondary market, and may be cumbersome to assemble. Moreover, such arrangements themselves fail to remain in a substantially fixed position.

In addition to the foregoing problems, cargo areas, unlike trunk compartments, are generally open spaces with no deep recesses that can be used to conveniently transport and store cargo.

A storage apparatus is needed that permits cargo to be transported and stored in a motor vehicle without shifting or spilling and which permits cargo to be recovered without requiring the motor vehicle operator or passenger to bend and stretch deep within the motor vehicle cargo area or trunk compartment.

SUMMARY OF THE INVENTION

The present invention is directed towards a motor vehicle storage apparatus that meets the foregoing needs. The apparatus comprises a tray. Opposing doors are pivoted to the tray. The doors are displaceable between a raised position and a lowered position. Ends are pivoted to the tray. The ends are displaceable between a raised position and a lowered position. The doors and the ends cooperate to form peripheral walls for bounding a storage area when in the raised position.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
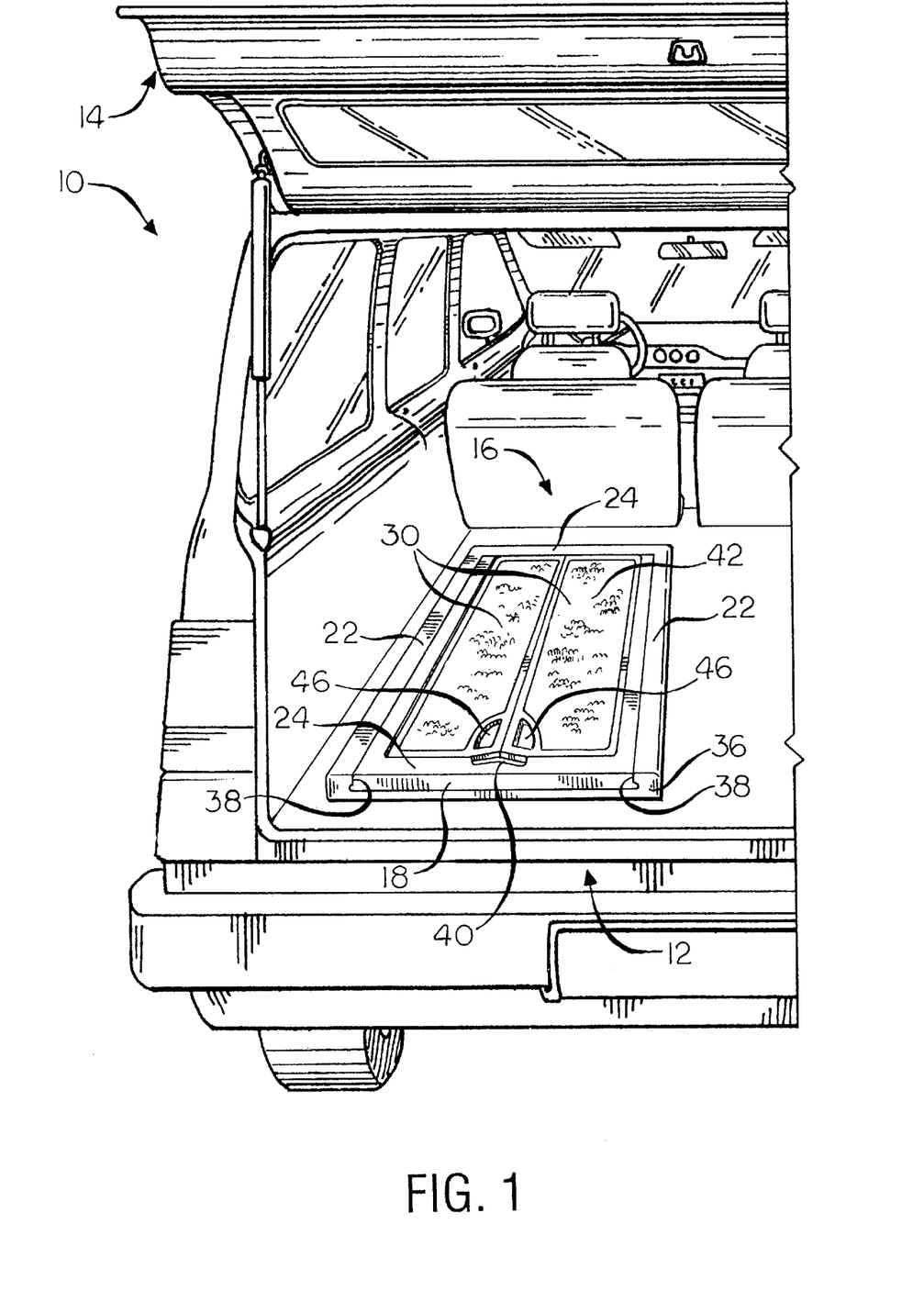
FIG. 1 is a rear perspective view of a motor vehicle with its cargo hatch open and a storage apparatus in its cargo area.

Referring now to the drawings, there is illustrated in FIG. 1 a motor vehicle 10 having a cargo area or truck compartment 12 for storing and transporting cargo (not shown). The cargo area 12 is bounded by opposing laterally space walls and a rear seat. A support or load surface is provided for supporting cargo. A cargo hatch or trunk lid 14 is provided for concealing the cargo area 12.

Figure 2:
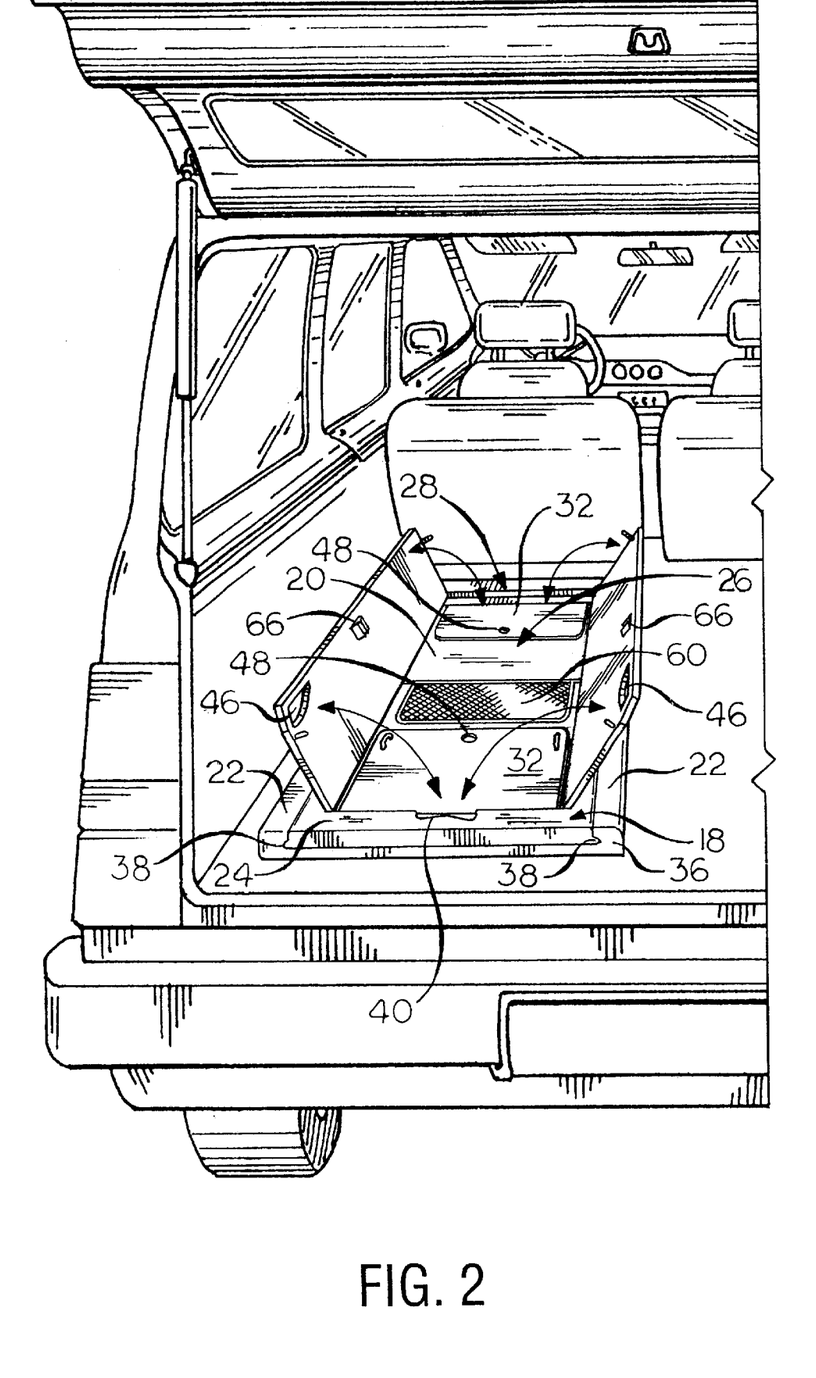
FIG. 2 is a rear perspective view of the motor vehicle and storage apparatus shown in FIG. 1 further showing longitudinally extending doors of the storage apparatus raised to reveal a pocket and a pocket opening in a tray.
Figure 3:
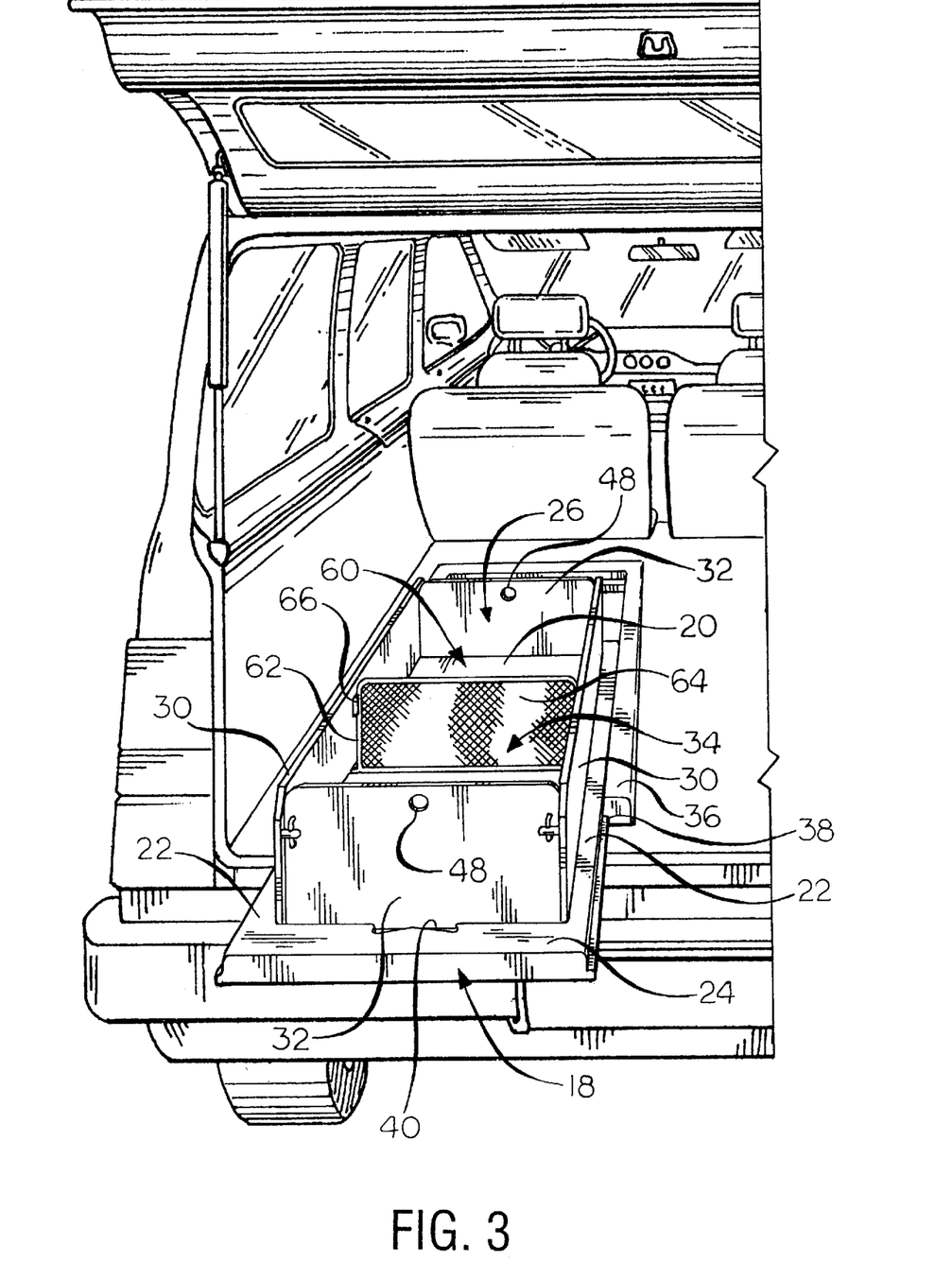
FIG. 3 is a rear perspective view of the motor vehicle and storage apparatus shown in FIGS. 1 and 2 further showing the tray of the storage apparatus displaced rearward, from the cargo area and the longitudinally extending doors and end panels of the storage apparatus raised to form a storage area.

A motor vehicle storage apparatus 16 is adapted to be inserted in the cargo area 12. Although only one apparatus 16 is shown, it should be understood that a plurality of apparatus 16 may be inserted in the cargo area 12. The apparatus 16 includes a storage bin or tray 18. The tray 18 has a bottom panel 20, as shown in FIGS. 2 and 3, and peripheral walls 22, 24 extending from the bottom panel 20. The peripheral walls 22, 24 respectively include opposing longitudinally and laterally extending walls. These walls cooperatively define or form a recess or pocket 26 in the tray 18 and an upper or upwardly situated opening 28 to the pocket 26. The bottom panel 20 defines a support or load surface for supporting cargo (not shown).

The apparatus 16 has a pair of opposing longitudinally extending doors 30. Each of the longitudinally extending doors 30 is hinged or pivoted along a corresponding one of the longitudinally extending walls 22. The longitudinally extending doors 30 are pivoted adjacent the tray opening 28. The longitudinally extending doors 30 are displaceable between an opened, upwardly extending position (shown in FIG. 2) and a closed, substantially horizontal position (shown in FIG. 1). In the opened position, the tray opening 28 is revealed and access to the pocket 26 is provided. In the closed position, the tray opening 28 and the pocket 26 are concealed.

As shown in FIG. 3, each of the opposing laterally extending ends or end panels 32 is hinged or pivoted along a corresponding one of the laterally extending walls 24. The laterally extending walls 24 are pivoted within or inside the pocket 26. The end panels 32 are displaceable between an upwardly extending position (shown in FIG. 3) and a substantially horizontal position (shown in FIGS. 1 and 2). The longitudinally extending doors 30 and end panels 32 cooperate to form peripheral walls when the doors 30 and panels 32 are in the upwardly extending position. A storage area, generally indicated at 34, and an upwardly exposed opening (shown but not referenced) to the storage area 34 are bounded by the peripheral walls.

As shown in FIGS. 1 through 3, the apparatus 16 may further comprise a base 36. The base 36 may include opposing rails or tracks 38. The tray 18 is adapted to engage the opposing tracks 38. This may be accomplished in any suitable manner. For example, the opposing tracks 38 may be in the form of longitudinally extending grooves and the tray 18 may be provided with opposing longitudinally extending projections that are adapted to slide in the grooves. As shown in FIG. 3, the tray 18 is longitudinally displaceable relative to the opposing tracks 38. This permits the tray 18, or at least a portion thereof, to be rearward displaced from the cargo area 12. To assist a user in displacing the tray 18, a handle or handhold 40 may be provided on or in the tray 18. To displace the tray 18 rearward, the user merely needs to pull rearward on the handhold 40.

It should be appreciated that the longitudinally extending doors 30 may have an outer or upper surface (shown in FIG. 1) that is adapted to support upholstery 42, such as carpeting. The upper surface may be provided with a recessed area. The upholstery 42 may be disposed within the recessed area so that the upholstery 42 may be substantially flush with a remaining part of the upper surface.

It should be further appreciated that the base 36 and the tray 18, together with the upholstery 42, may be colored to match or complement the interior color of the motor vehicle 10. For example, the base 36 and the tray 18 may be molded from the same type and color of material that other interior parts and panels of the motor vehicle 10 are molded.

It should be noted that the upper surface of the longitudinally extending doors 30 may support frictional material (not shown) in the place of, or in addition to, the upholstery 42. The frictional material may be provided for frictionally engaging cargo stored on the upper surface of the longitudinally extending doors 30. Any frictional material may be suitable for carrying out the invention. Rubber or grit materials are two types of frictional materials that are adapted for use with the invention.

Figure 4:
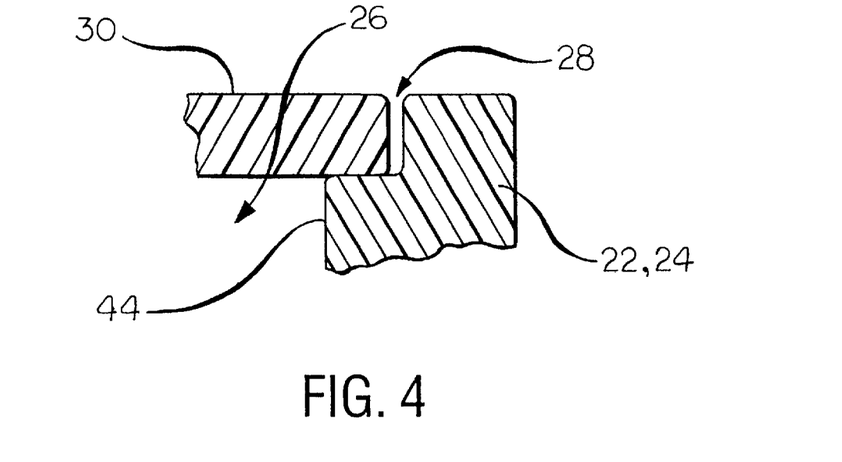
FIG. 4 is an enlarged partial sectional view of a longitudinally extending door and a peripheral shoulder in a pocket defined by the tray.

Cargo stored on the longitudinally extending doors 30 may subject the longitudinally extending doors 30 to a significant load. For this reason, it may be desirous to provide a peripheral shoulder 44 (shown in FIG. 4) within the pocket 26 about the tray opening 28. Upon closing the longitudinally extending doors 30, the longitudinally extending doors 30 engage the peripheral shoulder 44. The peripheral shoulder 44 provides vertical support for the peripheral edges (shown but not referenced) of the longitudinally extending doors 30.

Each of the longitudinally extending doors 30 may be provided with a handle or handhold 46 which may be grasped by a user when opening the longitudinally extending doors 30. An example of a handhold 46 is shown in FIGS. 1 and 2. This handhold 46 is in the form of an arcuate cutout or relief in the rear most corner of the longitudinally extending doors 30 along a free edge (the edge opposite the pivoted edge) of the longitudinally extending doors 30. A user may reach into the relief and lift up on the longitudinally extending doors 30 by applying an upward force against a lower surface, or the underside, of the longitudinally extending doors 30.

The end panels 32 may likewise be provided with a handle or a handhold 48, as shown in FIGS. 2 and 3. This handhold 48 may be in any suitable form. The handhold 48 shown is in the form of a hole passing through the end panels 32. The handhold 48 is preferably provided at the center of the end panels 32 between the lateral edges and proximate a free edge (the edge opposite the pivoted edge) of the end panels 32. A user may reach into the hole and lift up on the end panels 32 by applying an upward force against a lower surface, or the underside, of the longitudinally extending doors 30.

The longitudinally extending doors 30 and end panels 32 are adapted to be fixed in a substantially fixed position relative to one another when opened. This may be accomplished in a myriad of ways. For example, the longitudinally extending doors 30 and end panels 32 may be configured to engage one another so that said longitudinally extending doors 30 and said laterally extending end panels 32 remain in a substantially fixed position relative to one another. This may be accomplished with retainers, such as the retaining clip 50 shown in FIG. 5. The retaining clips 50 shown extend from the lower surface of the longitudinally extending doors 30. The retaining clips 50 may be in the form of posts each having a relief 52 therein and a captive opening 54 communicating with the relief 52. The end panels 32 may support clip-engaging elements 56. Each clip-engaging element 56 is adapted to engage a corresponding one of the retaining clips 50. Each clip-engaging element 56 is adapted to into a relief 52. The captive opening 54 provides an interference fit for the retaining clips 50 to retain the clip-engaging element 56 in the relief 52. This provides a snap-fit arrangement between the longitudinally extending doors 30 and the end panels 32.

Figure 5:
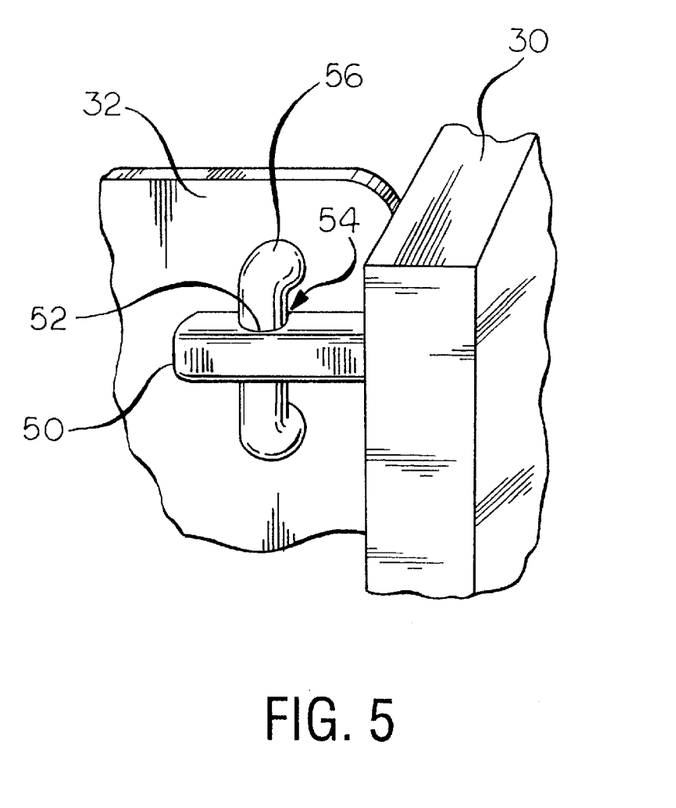
FIG. 5 is an enlarged rear perspective view of a retaining clip and clip-engaging element for retaining the longitudinally extending doors and end panels in a raised position.

It should be noted that the retaining clips 50 may be dimensioned to provide vertical support for the longitudinally extending doors 30 when the longitudinally extending doors 30 are in the closed position. This could supplement vertical support provided by the peripheral shoulder 44 or eliminate the need for a peripheral shoulder 44.

It should be clearly understood that an interference fit may be provided between the longitudinally extending doors 30 and the tray 18 and further between the end panels 32 and the tray 18. The longitudinally extending doors 30 and the end panels 32 need not engage one another to be held in a substantially fixed position relative to one another.

The aforementioned interference fit is merely illustrative of a manner in which the longitudinally extending doors 30 and the end panels 32 may be fixed or held in an upwardly extending position. Clearly, the present invention is not limited to be practiced by retainers that provide an interference fit.

As shown in FIG. 3, the storage area 34 may be divided into a plurality of storage areas. This may be accomplished with a partition, such as the partition 60 shown. The partition 60 is provided in the pocket 26. The partition 60 may be displaceable between a raised position (shown in FIG. 3) and a lowered position (shown in FIGS. 2 and 6). In the raised position, the partition 60 divides the storage area 34 into a plurality of storage areas. In the lowered position, a single storage area 34 is provided. Although not shown, it should be understood that a number of partitions 60 may be provided.

Figure 6:
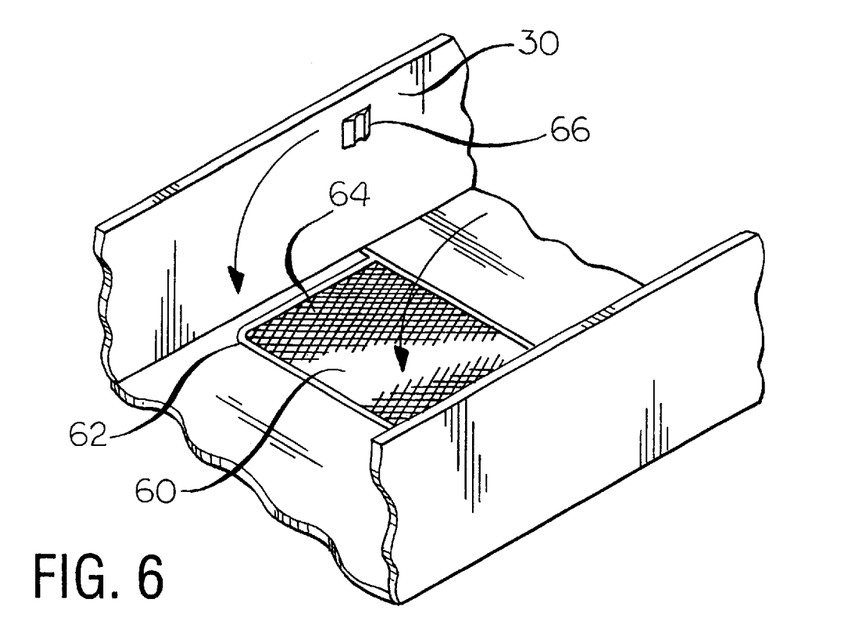
FIG. 6 is an enlarged partial rear perspective view of the storage apparatus with a partition thereof in a lowered position.

The partition 60 may be hinged or pivotally attached within the pocket 26. Alternatively, the partition 60 may be a separate element (not shown) which may be attached to, and detached from, the tray 18.

Figure 7:
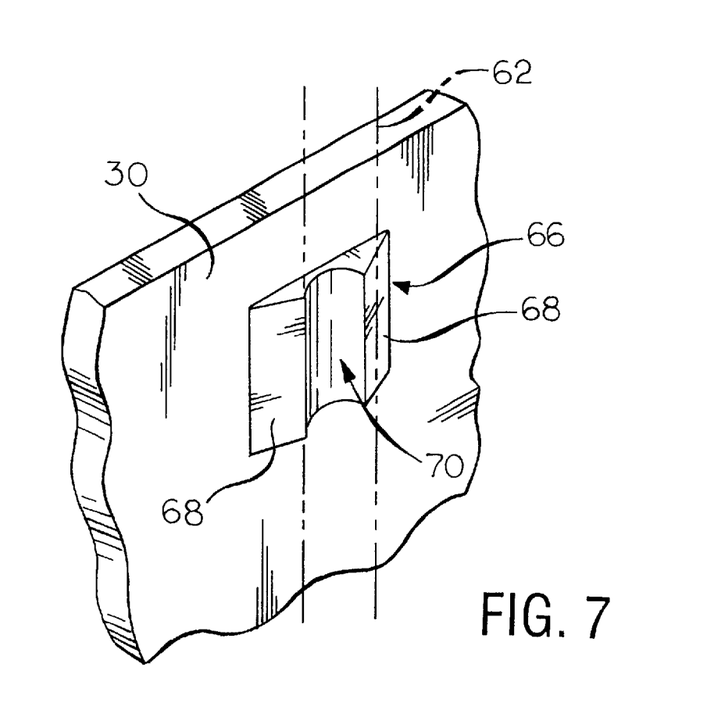
FIG. 7 is an enlarged rear perspective view of a clip for holding the partition shown in FIG. 6 in a raised position.

The partition 60 may be fixed in a raised position in any suitable manner. One manner in which the partition 60 may be fixed in a raised position is shown in the drawings. In FIG. 7, there is illustrated a clip 66 attached to the lower surface of each longitudinally extending door 30. The clip 66 comprises opposing ramp surfaces 68. A semi-cylindrical recess 70 is provided between the ramp surfaces 68. When raised, the partition 60 traverses the ramp surfaces 68 and snaps into the semi-cylindrical recess 70. To lower the partition 60, force sufficient to unsnap the partition 60 from the semi-cylindrical recess 70 must be applied.

Any suitable partition 60 may be provided. One such partition 60 may include a peripheral frame 62 and a net 64 supported by said frame 62. The frame 62 may be formed from a metal rod, a rigid plastic, or some other suitable material. The net may be formed from nylon or some other suitable material. The bungee net may be suitable for carrying out the invention.

Figure 8:
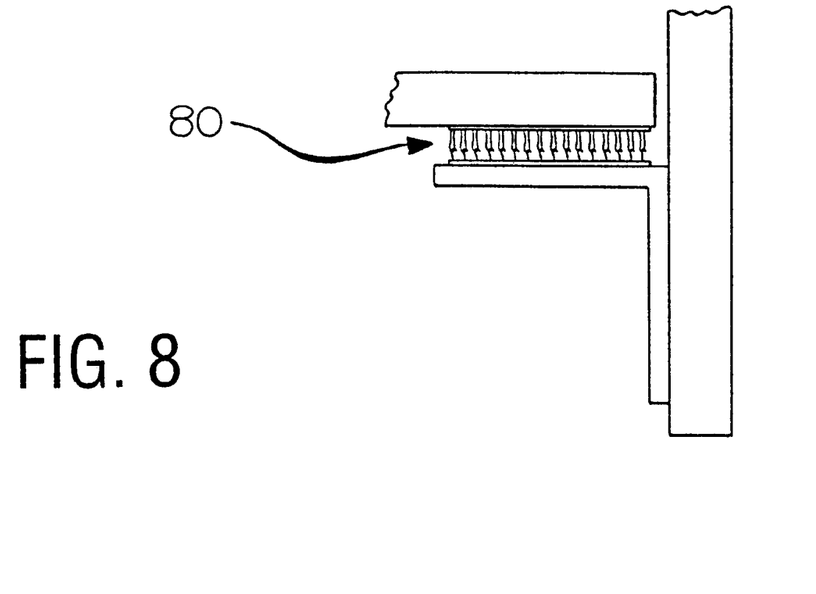
FIG. 8 is an enlarged top plan view of an alternative retainer or fastener for use with the invention.
Figure 9:
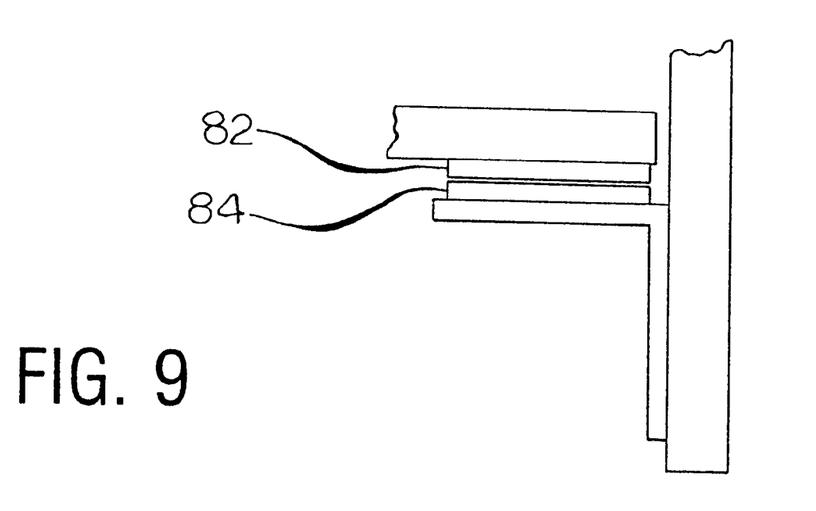
FIG. 9 is an enlarged top plan view of another retainer or fastener for use with the invention.
Figure 10:
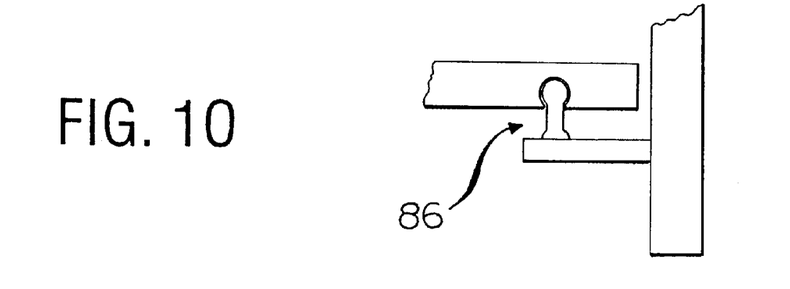
FIG. 10 is an enlarged top plan view of another retainer or fastener for use with the invention.
Figure 11:
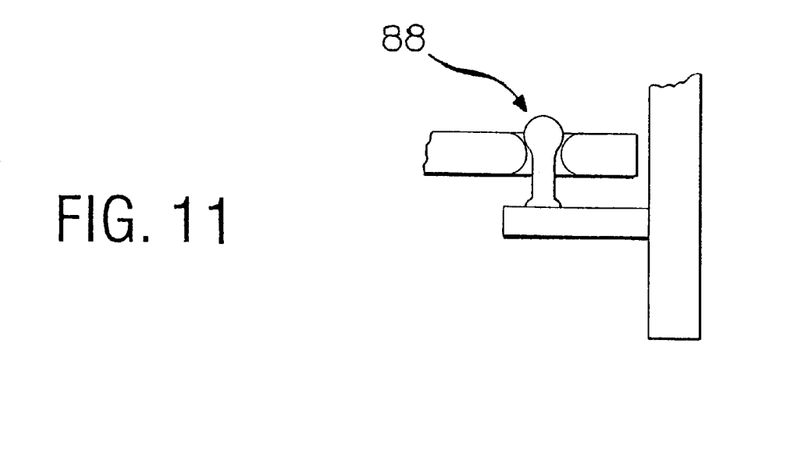
FIG. 11 is an enlarged top plan view of yet another retainer or fastener for use with the invention.
Figure 12:
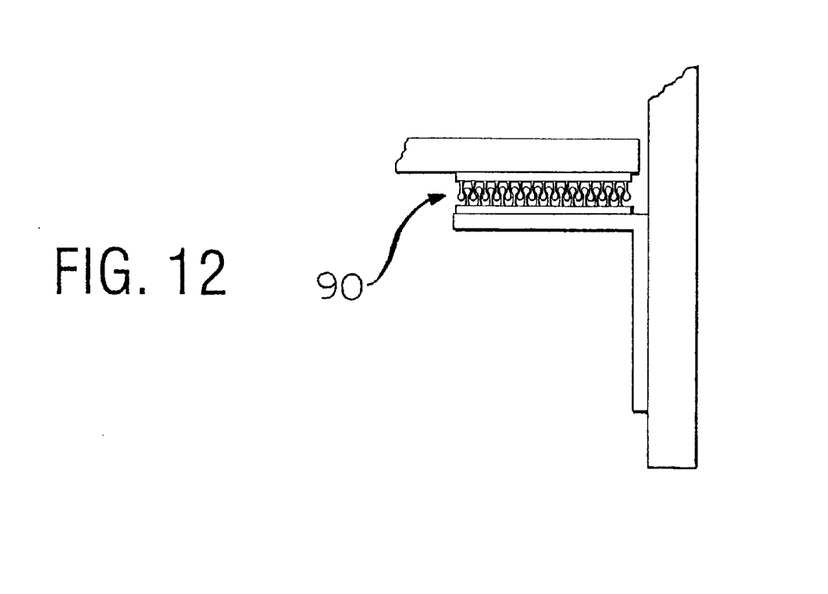
FIG. 12 is an enlarged top plan view of still another retainer or fastener for use with the invention.

The invention is not intended to be limited to the retaining clip 50 and clip engaging element 56 shown in FIG. 5 or the clip 66 shown in FIG. 6. Other retainers or fasteners may be suitable for carrying out invention. For example, the hook and loop fastener 80 shown in FIG. 8 may be a suitable for carrying out the invention. Alternatively, a magnetic fastener, such as the cooperating magnetic and metallic plates 82, 84 shown in FIG. 9, may be employed. Other the interference fit configurations, such as the cooperating fasteners 86, 88 shown in FIGS. 10 and 11, may be suitable retainers or fasteners. Even a fastening system 90, such as shown in FIG. 12, may be suitable for carrying out the invention. The system employs Dual Locks by 3M Corporation of Saint Paul, Minn. Dual Locks are strips of flexible plastic covered with mushroom-shaped interlocking heads 90 that fasten securely when pressed together. It should be understood these retainers or fasteners are merely provided for illustrative purposes and that other retainers or fasteners may be suitable for carrying out the invention.

In operation, the apparatus 16 is inserted into the cargo area 12 of a motor vehicle 10. The apparatus 16 is preferably fastened within the cargo area 12 so that the apparatus 16 remains in a substantially fixed position within the cargo area 12. With the longitudinally extending doors 30 closed, the upper or outer surface of the longitudinally extending doors 30 may be used for a load surface for storing and transporting thereon cargo. The end panels 32 and partition 60 are lowered and concealed in the pocket 26 of the tray 18. The storage area 34 may be formed by opening the longitudinally extending doors 30, raising the end panels 32, and securing the longitudinally extending doors 30 and end panels 32 in a substantially fixed position relative to one another. Cargo stored in the storage area 34 is bounded by the longitudinally extending doors 30 and end panels 32 and thus, prevented from moving about the cargo area 12 of the motor vehicle 10. Cargo stored on the load surface or in the storage area 34 may be easily accessed by displacing the tray 18 rearward. It should be noted that a user need not stretch forward to reach cargo deep within the cargo area 12.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A motor vehicle storage apparatus comprising:
   a base adapted to be attached to a vehicle floor;
   a tray slidably mounted on said base;
   a pair of opposing doors each pivoted to said tray, said doors being displaceable between a raised position and a lowered position; and
   a pair of opposing ends each pivoted to said tray, said ends being displaceable between a raised position and a lowered position, said doors and said ends cooperating to form walls for bounding a storage area when in the raised position.

2. An apparatus according to claim 1 wherein said doors and said ends are adapted to cooperatively engage one another so that said doors and said ends remain in a substantially fixed position relative to one another.

3. An apparatus according to claim 1 further comprising retainers for retaining said ends in a substantially fixed position relative to said doors.

4. An apparatus according to claim 1 further comprising a partition, said partition being displaceable between a raised position and a lowered position, said partition dividing said storage area into a plurality of storage areas when in the raised position.

5. An apparatus according to claim 4 wherein said partition is pivotally attached to said tray.

6. An apparatus according to claim 4 wherein said partition includes a peripheral frame and a net supported by said frame.

7. An apparatus according to claim 1, wherein said base includes a groove, said tray including a track portion disposed in said groove for slidably mounting said tray to said base.

8. An apparatus according to claim 1 in combination with a motor vehicle having a cargo area defining a rear opening, and wherein said tray is slidably mounted on said base such that said tray is movable to a position wherein a portion of said tray extends beyond said rear opening of said cargo area.

* * * * *